Figure 1:
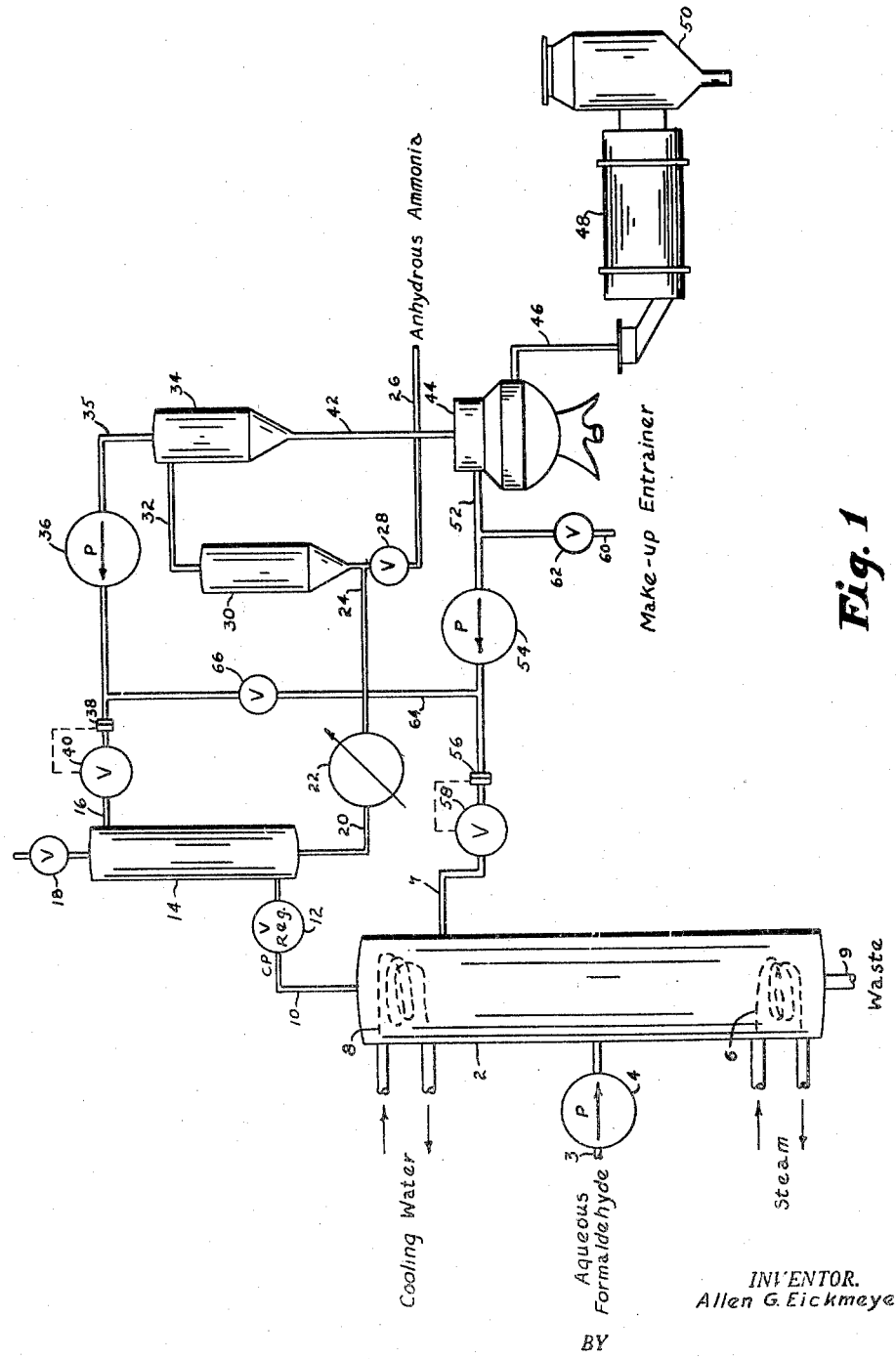

Feb. 20, 1951 A. G. EICKMEYER 2,542,315
METHOD FOR PRODUCTION OF HEXAMETHYLENETETRAMINE
Filed Feb. 21, 1949

INVENTOR.
Allen G. Eickmeyer
BY

Patented Feb. 20, 1951

2,542,315

UNITED STATES PATENT OFFICE 2,542,315

METHOD FOR PRODUCTION OF HEXAMETHYLENETETRAMINE

Allen G. Eickmeyer, Tulsa, Okla.

Application February 21, 1949, Serial No. 77,587

15 Claims. (Cl. 260—248.6)

This invention relates to methods for the production of hexamethylenetetramine and more particularly, but not by way of limitation, to a combination of distillation of formaldehyde solutions with a reflux of a volatile water-miscible entrainer liquid and the reaction of the distillation column overhead stream with anhydrous ammonia.

Hexamethylenetetramine, usually called hexamine, is commonly produced by reaction of gaseous ammonia absorbed in aqueous solutions of formaldehyde under controlled atmospheric temperature conditions to prevent the loss of valuable vapors. The reaction may be represented as follows:

$$6HCHO + 4NH_3 = (CH_2)_6N_4 + 6H_2O + Heat$$

Hence a formaldehyde to ammonia molecular ratio of substantially 3:2 is required, and not only hexamine, but also water and heat are products of the reaction. Hexamine is quite soluble in water and the solution of hexamine produced by the reaction is concentrated by vacuum evaporation until crystallization of the product occurs. The hexamine crystals are separated by filtration or centrifugation, washed and dried. The mother liquor and washings are reworked. The process cycle operations are ordinarily performed batchwise, or semi-continuously and require attention and handling, which render the conventional production methods costly.

In Patent No. 1,774,929, issued September 2, 1930, Landt and Adams describe an allegedly continuous method for hexamine comprising passing formaldehyde and ammonia into alcohol at a temperature below 75° C. and precipitating hexamine therefrom. Their process however, relies on anhydrous formaldehyde, which is ordinarily costly to produce. Also, no provision was made for the continuous removal of the water of reaction from the alcoholic reaction medium so that their process could be performed only intermittently rather than continuously. My invention concerns a co-acting combination wherein a volatile organic liquid described hereinafter serves both as a formaldehyde dehydration agent and as a reaction medium for formaldehyde and ammonia. Further, the unique combination provides for the continuous removal of the water of reaction from the reaction system.

The distillation and reaction steps of the process of my invention are readily amenable to continuous operation and, for the most part, may be automatically controlled by instrument. Thus, the operation requires little attention and permits more economic production. Further, sufficient water is separated from formaldehyde prior to the reaction with ammonia so that the use of vacuum evaporation is obviated.

An important object of this invention is to provide a method for the production of hexamine which may be performed continuously.

Another object of this invention is to provide a method for production of hexamine by reaction of formaldehyde and ammonia under sufficiently anhydrous conditions so as to obviate the use of vacuum distillation to separate the product from water.

And still another object of this invention is to provide a method for the production of hexamine by reaction of formaldehyde and ammonia whereby the product may be readily separated from the reaction medium.

And still another object of the invention is to produce hexamine by a combination of interdependent distillation and reaction systems.

And still another object of this invetion is to produce hexamine by a combination of distillation and reaction systems wherein both formaldehyde and the reaction medium are simultaneously dehydrated by distillation.

These and other objects and advantages of the invention will be evident from the following detailed description, read in conjunction with the accompanying drawing, which illustrates my invention.

Fig. 1 is a schematic flow diagram of a preferred embodiment of the process of my invention.

In accordance with my invention a volatile, water-miscible organic liquid, hereinafter referred to as the "entrainer," serves as a formaldehyde dehydration agent and also as the principal constituent of a reaction medium for the formation of hexamine. A suitable entrainer must be substantially non-reactive with formaldehyde under the conditions of the operation. Organic liqiuds of the above description are characterized by a much lower solubility for hexamine than that possessed by water. Therefore, said liquids are capable of precipitating solid hexamine continuously as hexamine is being formed by reaction of formaldehyde and ammonia, provided that the concentration of water is maintained sufficiently limited. In the process of my invention, a solution of formaldehyde, such as aqueous commercial formalin containing 37% HCHO, is distilled under superatmospheric pressure; the ascending vapors, comprising essentially water and formaldehyde, are refluxed by a stream of a volatile, water-miscible organic entrainer liquid which is either non-azeotropic with water or which forms a homogeneous azeotrope containing a minor proportion of water. Said entrainer liquid serves to condense water vapor while becoming vaporized itself and to entrain and carry the formaldehyde overhead from the distillation column in a substantially anhydrous condition. The overhead stream is contacted with substantially anhydrous ammonia whereupon reaction proceeds and liberates heat, which is removed by suitable cooling means. Hexamine, formed by reaction of ammonia with formaldehyde, precipitates from the entrainer liquid and the net product is separated therefrom by sedimentation, centrifugation, filtration, or a combination of these methods, followed by drying. The clear entrainer, which is separated from the hexamine net product is sent back to a distillation column as reflux. This reflux stream contains the water of reaction and thereby serves to continuously dehydrate the reaction system. The water descends through the distillation column and, at the bottom, is rejected. Also a small quantity of hexamine dissolved in the entrainer is introduced into the distillation column via the reflux stream. As the hexamine descends into the lower portion, or stripping section, of the column and contacts boiling water, it becomes hydrolyzed to a certain extent and is partially recovered as formaldehyde and ammonia vapors carried overhead. Also excess ammonia or formaldehyde which may be dissolved in the refluxed entrainer are vaporized and recovered overhead.

As described hereinafter, the aforementioned cooling and ammonia contacting are preferably performed simultaneously by contacting the column overhead stream with a recycled stream of cooled entrainer with ammonia absorbed therein and preferably containing fine hexamine crystals suspended as a slurry which present nuclei for the precipitation of newly-formed hexamine. This technique prevents attaining excessive reaction temperatures. Also, control over hexamine product particle size is obtained by governing the slurry solids content, recycle rate, and temperature. It will be apparent that a small amount of water produced by the reaction of ammonia and formaldehyde is present in the slurry. However, the water of reaction is prevented from building up in the slurry system since water is miscible with the entrainer and, therefore, is continuously removed by the reflux stream.

The distillation pressure is determined primarily by economic considerations. At low pressures, steam requirements become excessive. At the high temperatures resulting from high pressures formaldehyde decomposes by the Cannizzaro reaction which yields methanol and formic acid. Not only is formaldehyde lost thereby, but also corrosion becomes more severe. The distillation may be performed at a pressure between approximately 5 and 150 pounds per square inch gage, however a preferred range of pressure is from 15 to 60 p. s. i. g. and the optimum range is from 20 to 40 p. s. i. g.

Suitable entrainers are characterized by a boiling point lower than that of water. On the other hand, the boiling point should be sufficiently high so that the entrainer is condensable at the distillation operating pressure, and at normal cooling water temperatures. Stated otherwise the entrainer has a normal boiling point below 100° C. and is readily condensable at the pressure of distillation. The entrainer is sufficiently miscible with water so that the water of reaction is absorbed and removed from the reaction system by the above-mentioned reflux stream. Organic liquids having these characteristics are either non-azeotropic with water or form homogeneous azeotropes having a minor proportion of water. Further, suitable entrainers are substantially non-reactive with formaldehyde. By the term "substantially non-reactive" it is not intended to exclude those materials which form loosely held addition compounds with formaldehyde such as the hemiacetals formed with the alcohols. Examples of suitable entrainers are the ketones such as, acetone and methyl-ethyl ketone, and the alcohols such as methanol, ethanol, iso and normal propanol, and tertiary butanol. Also methylal, which is partly miscible with water, may be used. In some instances mixtures, such as azeotropic mixtures, may be used, as for example, acetone and methanol. From the standpoint of cost and efficiency, acetone and ethanol are the preferred entrainers.

A preferred embodiment of my invention for the production of hexamine is illustrated by the flow sheet of Fig. 1. Reference character 2 is a pressure distillation column having conventional trays or packing (not shown) for the purpose of obtaining intimate contact between the rising vapors, and the descending liquid. Aqueous formaldehyde is introduced into the column through line 3 and pump 4 and passes downward through the stripping section of the column. If desired, the feed may be heated or vaporized by a pre-heater (not shown). Steam in steam coils 6 generates vapors which ascend throughout the column. Under the influence of heat, formaldehyde hydrates break down and gaseous formaldehyde is formed which passes upward together with water vapor into the upper section of the column, commonly termed the enriching section. In the enriching section the vapors contact the down-flowing reflux which has a high concentration of the entrainer liquid. Water vapor is preferentially condensed while simultaneously the entrainer is vaporized. A reflux stream is introduced through line 7. Additional reflux is preferably generated by partial condenser 8. Condenser 8 may be located either internally, as shown, or externally from the column.

The descending reflux changes in composition throughout the column until finally the down-flowing liquid at the bottom is essentially water which is discharged through line 9, and sent to waste. The column overhead stream, comprising essentially formaldehyde and entrainer vapors, pass through line 10 and pressure control valve 12 into absorber 14. It should be pointed out that the overhead stream may be completely condensed in some instances, particularly with low concentrations of formaldehyde or when using the lower alcohols as entrainers. At the higher formaldehyde concentrations and with other entrainers, precipitation of paraformaldehyde is usually encountered when the overhead vapors are totally condensed. In this event, the overhead stream is preferably handled as a vapor, as indicated. In absorber 14 the formaldehyde and entrainer vapors rise and are cooled and condensed by contact with a descending slurry of hexamine suspended in the entrainer liquid, which is introduced through line 16. If a fine particle size of hexamine is desired, substantially clear entrainer may be introduced through line 16. Noncondensable gases, if present, are vented through valve 18. The hexamine slurry contains absorbed ammonia, which reacts with the formaldehyde to produce additional hexamine and water. The reaction liberates heat so that the slurry leaving absorber 14 is hot. It is conducted by line 20 to cooler 22 for lowering the temperature. The cooled slurry passes through line 24 and is mixed with anhydrous ammonia admitted through line 26 and valve 28, and the mixture passes into equilibrator 30. At this point the slurry now has excess ammonia absorbed therein, which tends to reduce the solubility of hexamine. The equilibrator 30 simply provides additional time for precipitation and hexamine crystal growth and is not essential to operability of the process. The equilibrated slurry passes through line 32 into thickener 34, wherein the larger hexamine particles tend to drop out, while the finer particles are carried overhead through recycle line 35 and pump 36. The recycled slurry then passes through orifice meter 38 and flow control valve 40 and through line 16, which admits the stream to absorber 14. The larger hexamine particles are discharged from thickener 34 through line 42 into centrifugal separator 44. The hexamine product is discharged from centrifugal separator 44 as a thick paste and is conveyed by conduit 46 to the dryer 48 and the dry product is discharged into hopper 50. Vapor recovery equipment (not shown) is ordinarily used to recover the entrainer evaporated in dryer 48. Substantially clear entrainer liquid is discharged from centrifugal separator 44 through line 52, pump 54, orifice meter 56 and flow control valve 58, and is admitted through line 7 as reflux to column 2. The entrainer from the vapor recovery system (not shown) and other make-up entrainer, required to counter-balance losses, is admitted through line 60 and valve 62 and sent as reflux to column 2 together with the clear entrainer in line 52. If it is desired to thin out the slurry stream recycled to absorber 14 through line 16, a portion of the substantially clear entrainer from pump 54 is passed through line 64 and valve 66.

It will be apparent that some water may be carried overhead from column 2 and also a certain amount of water of reaction will be present in the slurry system and the reflux stream 7. The concentration of water in the reflux depends upon the molecular ratio of water plus formaldehyde to the entrainer in the stream carried overhead from the distillation column 2 through line 10 and admitted to the reaction cystem. However, it will be noted that such water is continuously discharged from the reaction system and sent back as reflux to column 2, wherein the water descends and is eventually discharged from the bottom through line 9 and sent to waste. This reflux stream also contains a small amount of hexamine which passes downward through column 2 and, in the stripping section, undergoes partial hydrolysis in contact with hot water. Ammonia and formaldehyde resulting therefrom are recovered overhead. Excess ammonia or formaldehyde contained in reflux stream 7 is also vaporized and recovered overhead.

It should be pointed out that the flow diagram of Fig. 1 represents a rather elaborate system designed for the purpose of obtaining high efficiency and good yields of hexamine. The main essential feature of my invention is the co-acting combination of a distillation and reaction system wherein the reaction medium is used to dehydrate formaldehyde in the distillation system and the distillation serves to dehydrate the reaction medium. It will be apparent that the process of my invention can be performed with less equipment, omitting, for example, absorber 14. Also recycle stream 35 is a preferable but not an essential means of controlling the reaction temperature. For example, the following experiment was performed using laboratory equipment.

The distillation equipment used was constructed of steel and consisted of a pot, a length of one-inch pipe which served as a column and which was packed with quarter-inch berl saddles, a pressure gage on top of the column, a reflux line near the top, and an overhead line equipped with a needle valve for discharging the overhead product. The column was insulated except for the top twelve inches, which provided reflux by naturally occurring heat loss. The reflux line was equipped with a needle valve and connected to a reservoir designed to hold the entrainer liquid under air pressure. Two experiments were performed. In the first experiment, formalin was charged to the pot and methanol was in the reservoir. The column was warmed up and as the pressure increased, the methanol reflux was admitted slowly. When thirty pounds per square inch gage pressure was obtained, the overhead valve was opened slightly and the product was withdrawn at a rate approximately twice the reflux rate. When the methanol reflux was exhausted, distillation was discontinued. The overhead product, which had been totally condensed, was placed in a flask and anhydrous ammonia was bubbled through the liquid while the outside of the flask was cooled by a stream of water. After a time hexamine precipitated and formed a slurry with the methanol. After the slurry was saturated with ammonia, the hexamine was filtered and the filtrate was charged to the pressure reservoir to serve as reflux for the second experiment. The second experiment was performed in a manner similar to the first and a second hexamine product was obtained. It will be noted that a unique feature of my invention was demonstrated in the second experiment. Water produced by the reaction of formaldehyde and ammonia in the first experiment was present in the methanol reflux used in the second experiment. Thus, the intercourse of materials between the distillation and reaction systems effected dehydration not only of the formaldehyde but also of the methanol reaction medium. It will be apparent that similar batch operations could be repeated indefinitely and that a continuous process would result from continuous distillation together with continuous addition of ammonia, cooling of the reaction medium, separation of the solid hexamine product from the reaction medium and returning the reaction medium as reflux to the distillation.

While the preferred embodiment of my invention and the preferred entrainer liquids have been described, it is to be understood that my invention is not limited thereto. For the purposes of my invention, the formaldehyde entrainer and reaction medium may be any suitable liquid which is sufficiently non-reactive under the conditions of the process so as to render undesirable side reactions substantially negligible and which liquid has the physical properties necessary to perform the functions described hereinabove.

My invention is to be broadly construed within the scope of the following claims.

What I claim is:

1. The method of producing hexamethylenetetramine which comprises the steps of distilling a formaldehyde solution under super-atmospheric pressure, refluxing the ascending vapors with a relatively volatile water-miscible liquid and contacting the distillation overhead product with ammonia, said water-miscible liquid being characterized by substantial non-reactivity with respect to undesirable side reactions under the conditions of the process and by a normal boiling point below 100° centigrade.

2. The method of producing hexamethylenetetramine which comprises the steps of distilling aqueous formaldehyde in the presence of a reflux containing a relatively volatile water-miscible liquid and reacting the distillation overhead product with ammonia, said water-miscible liquid being characterized by substantial non-reactivity with respect to undesirable side reactions under the conditions of the process and by a normal boiling point below 100° centigrade.

3. The method of producing hexamethylenetetramine which comprises the steps of distilling a solution of formaldehyde under super-atmospheric pressure in the presence of a reflux containing a relatively volatile water-miscible entrainer liquid and contacting the distillation overhead product with a stream of substantially clear liquid containing said entrainer and having ammonia absorbed therein, said water-miscible liquid being characterized by substantial non-reactivity under the conditions of the process, by a normal boiling point below 100° centigrade, and by condensability under the pressure of the distillation.

4. The method of producing hexamethylenetetramine which comprises the steps of distilling a solution of formaldehyde under super-atmospheric pressure in the presence of a reflux containing a relatively volatile water-miscible entrainer liquid and contacting the distillation overhead product with a stream of slurry comprising hexamethylenetetramine suspended in a liquid containing said entrainer and having ammonia absorbed therein, said water-miscible liquid being characterized by substantial non-reactivity under the conditions of the process, by a normal boiling point below 100° centigrade, and by a condensability under the pressure of the distillation.

5. The method of producing hexamethylenetetramine which comprises the steps of distilling a solution of formaldehyde under super-atmospheric pressure in the presence of a reflux containing a relatively volatile water-miscible entrainer liquid and contacting the distillation overhead product with ammonia and a stream containing said entrainer liquid, said water-miscible liquid being characterized by substantial non-reactivity under the conditions of the process, by a normal boiling point below 100° centigrade, and by condensability under the pressure of the distillation.

6. The method of producing hexamethylenetetramine which comprises the steps of distilling a solution of formaldehyde under super-atmospheric pressure in the presence of a reflux containing a relatively volatile water-miscible entrainer liquid and reacting the distillation product with ammonia to form hexamethylenetetramine, cooling the reaction mixture and separating said hexamethylenetetramine from said entrainer liquid, said water-miscible liquid being characterized by substantial non-reactivity under the conditions of the process, by a normal boiling point below 100° centigrade, and by condensability under the pressure of the distillation.

7. The method of producing hexamethylenetetramine which comprises the steps of distilling a solution of formaldehyde under super-atmospheric pressure in the presence of a reflux containing a relatively volatile water-miscible entrainer liquid and reacting the distillation product with ammonia to form hexamethylenetetramine, cooling the reaction mixture, separating said hexamethylenetetramine and said entrainer liquid, and returning said separated entrainer liquid as reflux to said distilling operation, said water-miscible liquid being characterized by substantial non-reactivity under the conditions of the process, by a normal boiling point below 100° centigrade, and by condensability under the pressure of the distillation.

8. The method of producing hexamethylenetetramine which comprises the steps of dehydration of formaldehyde by distillation in the presence of a reflux of a relatively volatile water-miscible entrainer liquid and reaction of the overhead product of said distillation with ammonia, said water-miscible liquid being characterized by substantial non-reactivity under the conditions of the process, by a normal boiling point below 100° centigrade, and by condensability under the pressure of the distillation.

9. The method of producing hexamethylenetetramine which comprises the steps of dehydration of formaldehyde by distillation in the presence of a reflux of a relatively volatile water-miscible entrainer liquid and reaction of said distillation product with ammonia to form hexamethylenetetramine, separation of said hexamethylenetetramine from said entrainer liquid which is returned as reflux to said distillation, said water-miscible liquid being characterized by substantial non-reactivity under the conditions of the process, by a normal boiling point below 100° centigrade, and by condensability under the pressure of the distillation.

10. A method of producing hexamethylenetetramine which comprises the steps of reacting substantially dehydrated formaldehyde with ammonia in the presence of a volatile water-miscible liquid, separating hexamethylenetetramine from said liquid, and simultaneously dehydrating aqueous formaldehyde and said liquid by means of distillation, said water-miscible liquid being characterized by substantial non-reactivity under the conditions of the process, by a normal boiling point below 100° centigrade, and by condensability under the pressure of the distillation.

11. A method of producing hexamethylenetetramine which comprises the steps of distillation of aqueous formaldehyde at a pressure between 5 and 150 pounds per sq. in. gauge, refluxing the ascending vapors from said distillation with a volatile water-miscible liquid, reacting with ammonia the overhead product from said distillation, separating hexamethylenetetramine from said liquid, and returning separated said liquid as reflux to said distillation, said water-miscible liquid being characterized by substantial non-reactivity under the conditions of the process, by a normal boiling point below 100° centigrade, and by condensability under the pressure of the distillation.

12. A method of producing hexamethylenetetramine which comprises the steps of distillation of aqueous formaldehyde at a pressure between 15 and 60 pounds per sq. in. gauge, refluxing the ascending vapors from said distillation with a volatile water-miscible liquid, reacting with ammonia the overhead product from said distillation, separating hexamethylenetetramine from said liquid, and returning separated said liquid as reflux to said distillation, said water-miscible liquid being characterized by substantial non-reactivity under the conditions of the process, by a normal boiling point below 100° centigrade, and by condensability under the pressure of the distillation.

13. A method of producing hexamethylenetetramine which comprises the steps of distillation of aqueous formaldehyde at a pressure between 20 and 40 pounds per sq. in. gauge, refluxing the ascending vapors from said distillation with a volatile water-miscible liquid, reacting with ammonia the overhead product from said distillation, separating hexamethylenetetramine from said liquid, and returning separated said liquid as reflux to said distillation, said water-miscible liquid being characterized by substantial non-reactivity under the conditions of the process, by a normal boiling point below 100° centigrade, and by condensability under the pressure of the distillation.

14. A method of producing hexamethylenetetramine which comprises the steps of distillation of a formaldehyde solution in the presence of a reflux of a volatile water-miscible liquid, reaction of ammonia with the overhead product from said distillation to form hexamethylenetetramine suspended as a slurry in said liquid, separation of said hexamethylenetetramine from said liquid, and returning said liquid as reflux to said distillation, said water-miscible liquid being characterized by substantial non-reactivity under the conditions of the process, by a normal boiling point below 100° centigrade, by condensability under the pressure of distillation, and by a low solubility for hexamethylenetetramine.

15. A method of producing hexamethylenetetramine which comprises the steps of distillation of a formaldehyde solution in the presence of a reflux of a volatile water-miscible liquid, reaction of formaldehyde in the overhead product from said distillation with ammonia absorbed in a slurry of hexamethylenetetramine suspended in said liquid containing a minor proportion of water, cooling the reaction slurry, injection of substantially anhydrous ammonia into said cooled slurry, recycling a portion of said slurry containing ammonia to said reaction step, separating said liquid from hexamethylenetetramine in the remaining said slurry and returning said separated liquid as reflux to said distillation step, said water-miscible liquid being characterized by substantial non-reactivity under the conditions of the process, a normal boiling point below 100° centigrade, and condensability under the pressure of distillation.

ALLEN G. EICKMEYER.

REFERENCES CITED

The following references are of record in the file of this patent:

UNITED STATES PATENTS

| Number | Name | Date |
|---|---|---|
| 656,061 | Trillat | Aug. 14, 1908 |
| 1,423,753 | Carter | July 25, 1922 |
| 1,774,929 | Landt et al. | Sept. 2, 1930 |
| 2,256,497 | Reynolds | Sept. 23, 1941 |
| 2,257,780 | Bludworth | Oct. 7, 1941 |
| 2,283,911 | Brandt et al. | May 2, 1942 |
| 2,373,777 | Peterson | Aug. 17, 1945 |
| 2,452,414 | Wong | Oct. 26, 1948 |

FOREIGN PATENTS

| Number | Country | Date |
|---|---|---|
| 132,483 | Great Britain | Oct. 16, 1919 |